US009073022B2

(12) United States Patent
Mason

(10) Patent No.: US 9,073,022 B2
(45) Date of Patent: Jul. 7, 2015

(54) SYSTEM AND METHOD FOR RECYCLING SURFACTANT IN EMULSION PRODUCTION

(75) Inventor: Thomas G. Mason, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 957 days.

(21) Appl. No.: 13/259,859

(22) PCT Filed: Apr. 22, 2010

(86) PCT No.: PCT/US2010/032025
§ 371 (c)(1), (2), (4) Date: Sep. 23, 2011

(87) PCT Pub. No.: WO2010/124068
PCT Pub. Date: Oct. 28, 2010

(65) Prior Publication Data

US 2012/0029093 A1 Feb. 2, 2012

Related U.S. Application Data

(60) Provisional application No. 61/171,640, filed on Apr. 22, 2009.

(51) Int. Cl.

| | |
|---|---|
| ***B01F 3/08*** | (2006.01) |
| ***B01D 35/18*** | (2006.01) |
| ***B01D 35/00*** | (2006.01) |
| ***B01D 21/02*** | (2006.01) |
| ***B01F 15/02*** | (2006.01) |
| ***F25B 49/00*** | (2006.01) |

(52) U.S. Cl.
CPC .................................... *B01F 3/0811* (2013.01)

(58) Field of Classification Search
CPC ............................ B01F 3/0811; B01F 3/0807
USPC ............ 516/55; 210/175, 205, 407; 366/136; 62/132
See application file for complete search history.

(56) References Cited

U.S. PATENT DOCUMENTS

| | | | | |
|---|---|---|---|---|
| 3,102,100 | A * | 8/1963 | Greenwald | 516/59 |
| 5,083,872 | A | 1/1992 | Farling et al. | |
| 5,218,841 | A | 6/1993 | Hool | |
| 6,136,493 | A | 10/2000 | Fujiwara et al. | |

OTHER PUBLICATIONS

T.G. Mason, et al., Nanoemulsions: formation, structure and physical properties, J. Phys.: Condens. Matter 18, 2006, pp. R635-R666.
International Search Report and Written Opinion of PCT/US2010/032025.

* cited by examiner

*Primary Examiner* — William Cheung
(74) *Attorney, Agent, or Firm* — Venable LLP; Henry J. Daley

(57) ABSTRACT

A system for producing emulsions includes a liquid supply system, an emulsification system in liquid connection with the liquid supply system to receive a first liquid and a second liquid from the liquid supply system while in operation to be used to produce an emulsion therefrom, and a surfactant recovery system connected to the emulsification system to receive the emulsion when produced from the first and second liquids. The second liquid is immiscible with the first liquid, and the surfactant recovery system recovers at least a portion of surfactant from the emulsion when the emulsion is received from the emulsification system.

28 Claims, 1 Drawing Sheet

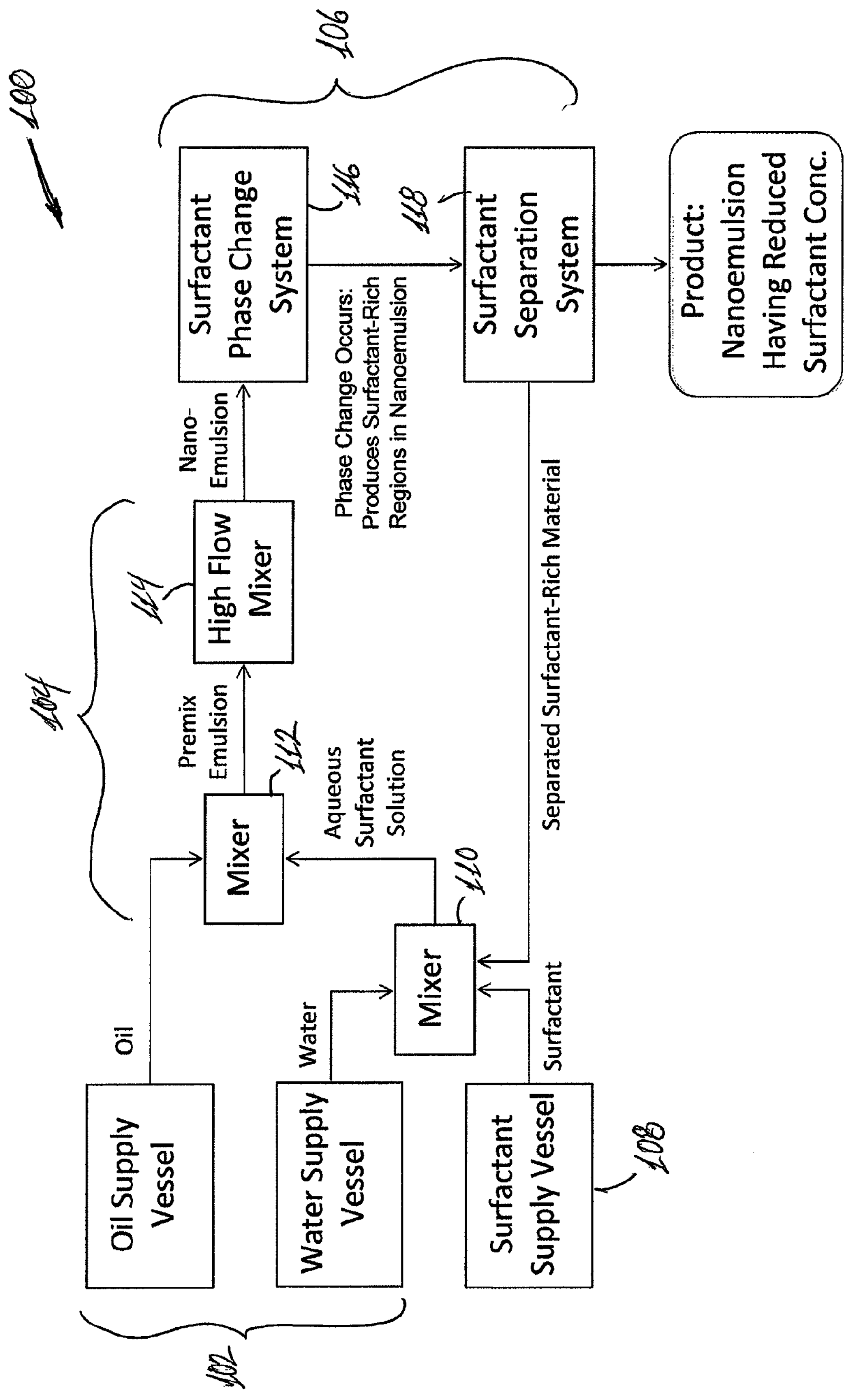
100
102
Oil Supply Vessel
Water Supply Vessel
Surfactant Supply Vessel
108
Oil
Water
Surfactant
Mixer
110
Aqueous Surfactant Solution
Mixer
112
Premix Emulsion
104
High Flow Mixer
114
Nano-Emulsion
106
Surfactant Phase Change System
116
Phase Change Occurs: Produces Surfactant-Rich Regions in Nanoemulsion
Surfactant Separation System
118
Separated Surfactant-Rich Material
Product: Nanoemulsion Having Reduced Surfactant Conc.

SYSTEM AND METHOD FOR RECYCLING SURFACTANT IN EMULSION PRODUCTION

CROSS-REFERENCE OF RELATED APPLICATION

This application claims priority to U.S. Provisional Application No. 61/171,640 filed Apr. 22, 2009, the entire content of which is hereby incorporated by reference, and is a national stage application under 35 U.S.C. §371 of PCT/US2010/03025 filed Apr. 22, 2010, the entire contents of which are incorporated herein by reference.

BACKGROUND

1. Field of Invention

The current invention relates to systems and methods of producing emulsions, and more particularly to systems and methods of producing emulsions that include recycling surfactant.

2. Discussion of Related Art

Extreme emulsification can be used to produce oil-in-water nanoemulsions with droplets that have radii, a, as small as about a~15 nm, yet typically a significant quantity of surfactant must be used to reach such small sizes (T. G. Mason, J. N. Wilking, K. Meleson, C. B. Chang, and S. M. Graves, Nanoemulsions: Formation, Structure, and Physical Properties, *J. Phys.: Condens. Matter* 18 R635-R666 (2006), the entire content of which is incorporated herein by reference). For lower surfactant concentrations that are more economical, droplet sizes are typically larger, in the range of a>40 nm. To reach sub-40 nm droplets using certain surfactants, it is typically necessary to use significant quantities of surfactant (even exceeding 10 mass percent for some surfactants) in the emulsion composition. A high concentration of surfactant in the continuous phase can serve multiple purposes that can be desirable in the production of extremely small droplets when fabricating nanoemulsions through droplet rupturing and breakup. A larger quantity of surfactant typically lowers interfacial tension between the continuous phase (i.e. 'base' liquid) and the dispersed phase (i.e. droplet material); it also raises the viscosity of the continuous phase, which can promote droplet rupturing to smaller sizes; and it can also more strongly inhibit flow-induced coalescence of droplets during extreme emulsification by providing a stronger short-range repulsive interaction between droplet interfaces. In making the smallest nanodroplets, it would be useful to have a method that can recover, re-use, and re-cycle at least a portion of the surfactant without causing coalescence of the droplets, since a high surfactant concentration may not even be desirable in a final product. The higher surfactant concentration can provide a route to a smaller droplet sizes at lower flow rates. After droplets have been ruptured down to nanoscale sizes through an emulsification process, a much lower concentration of surfactant (e.g. 1% or less by mass) is typically satisfactory to inhibit coalescence of the droplets, even at high enough droplet volume fractions where the nanoemulsion becomes a soft elastic solid. Therefore, there remains a need for improved systems and methods of producing emulsions.

SUMMARY

A system for producing emulsions according to an embodiment of the current invention includes a liquid supply system, an emulsification system in liquid connection with the liquid supply system to receive a first liquid and a second liquid from the liquid supply system while in operation to be used to produce an emulsion therefrom, and a surfactant recovery system connected to the emulsification system to receive the emulsion when produced from the first and second liquids. The second liquid is immiscible with the first liquid, and the surfactant recovery system recovers at least a portion of surfactant from the emulsion when the emulsion is received from the emulsification system.

A surfactant recovery system according to an embodiment of the current invention includes a surfactant phase change system adapted to receive an emulsion for processing, the emulsion comprising a plurality of droplets of a first liquid in a second liquid and having a first concentration of a surfactant, the surfactant phase change system being further adapted to subject the emulsion to a change in an environmental condition that causes the surfactant to form surfactant-enriched localized regions of concentrated surfactant; and a surfactant separation system adapted to remove at least some of the surfactant-enriched localized regions of concentrated surfactant from the emulsion such that the emulsion has a second concentration of the surfactant that is less than the first concentration of the surfactant.

A method of producing an emulsion according to an embodiment of the current invention includes providing first and second immiscible liquids, emulsifying the first and second liquids to provide an emulsion comprising a plurality of droplets of the first liquid in the second liquid, the emulsion having a first concentration of a surfactant, subjecting the emulsion to a change in an environmental condition that causes the surfactant to coalesce into localized regions of concentrated surfactant, and removing at least some of the localized regions of concentrated surfactant from the emulsion such that the emulsion has a second concentration of the surfactant that is less than the first concentration of the surfactant.

A method of recovering surfactant from an emulsion according to an embodiment of the current invention includes subjecting the emulsion to a change in an environmental condition that causes the surfactant to form surfactant-enriched localized regions of concentrated surfactant, and removing at least some of the surfactant-enriched localized regions of concentrated surfactant from the emulsion such that the emulsion has a second concentration of the surfactant that is less than the first concentration of the surfactant.

BRIEF DESCRIPTION OF THE DRAWINGS

Further objectives and advantages will become apparent from a consideration of the description, drawings, and examples.

FIG. 1 is a Schematic illustration of a system for producing emulsions according to an embodiment of the current invention.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited herein are incorporated by reference as if each had been individually incorporated.

An embodiment of the current invention includes a high-throughput process of making a nanoemulsion in which the surfactant used to achieve the smallest droplet sizes is at least partially recovered, either in pure form or in the form of a solution. Optionally, this surfactant can be re-used and even recycled during the emulsification process while also reducing the overall surfactant concentration in the resulting emulsion. The removal of the surfactant can be accomplished according to an embodiment of the invention by a phase transformation of the surfactant through one of a change in environment (e.g. temperature), a change in the composition of the nanoemulsion, or a combination thereof, and then a subsequent separation step. These changes can sometimes cause the aggregation or flocculation of the nanoemulsion without inducing droplet coalescence, and this effect can sometimes facilitate the separation of droplets from surfactant-rich regions that contain few droplets. Because nanoemulsions made of repulsively interacting droplets are highly dispersed thermally, it may be less desirable and more costly to separate the majority of droplets from the surfactant-rich regions by physical means such as ultracentrifugation. Once a portion of the surfactant has been removed, the composition of the nanoemulsion having reduced surfactant concentration can be adjusted as desired by adding either the continuous phase or a solution of the continuous phase containing surfactant.

FIG. 1 is a schematic illustration of a system for producing emulsions 100, according to an embodiment of the current invention. The system for producing emulsions 100 includes a liquid supply system 102, an emulsification system 104 in liquid connection with said liquid supply system 102 to receive a first liquid and a second liquid from said liquid supply system 102 while in operation to be used to produce an emulsion therefrom. The system for producing emulsions 100 also includes a surfactant recovery system 106 connected to said emulsification system 104 to receive the emulsion when produced from the first and second liquids. The second liquid is immiscible with the first liquid and the surfactant recovery system 106 recovers at least a portion of surfactant from the emulsion when the emulsion is received from the emulsification system 104.

The system for producing emulsions 100 also includes a surfactant supply system 108 and a surfactant mixing system 110 connected to the surfactant supply system 108 and to the liquid supply system 102. The surfactant mixing system 110 is adapted to receive surfactant and to mix the surfactant with at least one of the first and second liquids to be provided to the emulsification system 104. The surfactant mixing system 110 can be selected from available mixers, such as, but not limited to, mechanical mixers, for example. The surfactant mixing system 110 is connected to the surfactant recovery system 106 to receive recovered surfactant to be recirculated for further production of additional emulsion according to this embodiment of the current invention. However, such a feedback, recirculating structure is not required according to all embodiments of the current invention. For example, previously separated surfactant could also be used without a direct feedback in some embodiments of the current invention. Furthermore, some embodiments could just remove a portion of the surfactant, without necessarily reusing the surfactant to make additional quantities of emulsion.

The emulsification system 106 can be a single stage emulsification system according to some embodiments of the current invention, or could be a multistage emulsification system. In the example of FIG. 1, the emulsification system 106 is a multistage emulsification system, i.e., two-stage in this example. For example, the first stage 112 can be a mechanical mixer or other emulsifier to produce an emulsion having relatively large droplet sizes, for example. The second stage 114 can be a high-flow mixer to produce a nano-emulsion, for example. However, the general concepts of the current invention are not limited to these particular examples.

The surfactant recovery system 106 includes a surfactant phase change system 116 and a surfactant separation system 118. The surfactant phase change system 116 can include, for example, a temperature control system and a heat exchange system according to some embodiments of the current invention. For example, the temperature control system and said heat exchange system can be a temperature-controlled refrigeration system in some embodiments. However, the general concepts of the invention are not limited to this particular example. In some embodiments, the surfactant separation system 118 can include a filtration system.

Although the surfactant recovery system 106 is shown as a component of the system for producing emulsion 100 according to an embodiment of the current invention, other embodiments include surfactant recovery systems as stand-alone systems. For example, pre-produce and/or separately produced emulsions can be provided to such a stand-alone surfactant recovery system in order the further process the emulsion to either modify the emulsion itself and/or to recover some of the surfactant from the emulsion.

A method of producing an emulsion according to an embodiment of the current invention includes providing first and second immiscible liquids, emulsifying the first and second liquids to provide an emulsion that has a plurality of droplets of the first liquid in the second liquid such that the emulsion has a first concentration of a surfactant. The method also includes subjecting the emulsion to a change in an environmental condition and/or a change in chemical composition that causes the surfactant to form surfactant-enriched regions of concentrated surfactant, and removing at least some of the surfactant-enriched regions of concentrated surfactant from the emulsion such that the emulsion has a second concentration of the surfactant that is less than the first concentration of the surfactant. According to some embodiments of the current invention, the subjecting the emulsion to a change in an environmental condition can include at least one of a change of temperature, pressure, solvent quality and evaporation to cause the surfactant in the continuous phase to become enriched into localized regions of concentrated surfactant (e.g. lyotropic liquid crystalline phases or solid crystals). A change in solvent quality can be effected, for example, by adding a miscible liquid to the base liquid in the continuous phase, which can cause a change in relative intermolecular interactions (i.e. "solvent quality"). In other embodiments of the current invention, the subjecting the emulsion to a change in a chemical composition can include at least one of a change in ionic strength and pH to cause the surfactant in the continuous phase to become enriched into localized regions of concentrated surfactant. Whether through a change in environmental conditions, through a change in chemical composition, or a combination thereof, typically the chemical potential of the surfactant is altered in a manner for the surfactant to form inhomogeneities of surfactant-enriched regions that grow after the change is initiated. In some embodiments of the current invention, the process of forming surfactant-enriched regions is not instantaneous, and a sufficient time must elapse to allow a kinetic process for growth of one or more surfactant-enriched regions in the emulsion. Some embodiments of producing an emulsion according to the current invention can further include recycling at least some surfactant obtained from the removing at least some of the localized regions of concentrated surfactant from the emulsion for the production of additional emulsion.

According to some embodiments, the emulsion has an initial temperature after the emulsifying, and the subjecting the emulsion to the change in the environmental condition includes cooling the emulsion to a preselected temperature that is lower than the initial temperature of the emulsion. The surfactant can selected from surfactants that crystallize at the preselected temperature and the first and second liquids can be selected from liquids that remain liquid at the preselected temperature. For example, without limitation, the surfactant can be sodium dodecyl sulfate (SDS), the first liquid for the dispersed phase can be an oil suitable for creating a nanoemulsion (e.g. a silicone oil) and the second liquid, the main component of the continuous phase, can be water. Other materials can be mixed, dissolved, dispersed, or suspended in the oil and/or water in particular applications, for example, to obtain a desired emulsified end product. The removing at least some of the surfactant-enriched regions of concentrated surfactant from the emulsion according to some embodiments of the current invention can include filtering to separate at least some crystallized surfactant from the emulsion such that the emulsion has the second concentration of surfactant.

Other embodiments of the current invention can use a previously produced emulsion in order the further process the emulsion to either modify the emulsion itself and/or to recover some of the surfactant from the emulsion as described in the embodiment above.

The emulsifying can provide an emulsion such that the plurality of droplets has an ensemble average radius less than 1 μm, for example. The emulsifying can provide an emulsion such that the plurality of droplets has an ensemble average radius less than 100 nm, for example. The emulsifying can provide an emulsion such that the plurality of droplets has an ensemble average radius less than 20 nm, for example.

The second concentration of surfactant is sufficient to prevent coarsening of the emulsion for a predetermined period of time according to some embodiments of the current invention. According to some embodiments, the second concentration of the surfactant can be less than one-half the first concentration.

In FIG. 1, we illustrate a process for removing and re-using the excess surfactant used to make very small silicone oil-in-water nanoemulsions stabilized by the surfactant sodium dodecyl sulfate (SDS) according to an embodiment of the current invention. In this case the surfactant resides in the continuous liquid phase and on the surfaces of the droplets, but an insignificant proportion lies entirely within the droplets. Basically, the surfactant is soluble in only the continuous phase outside the droplets and adsorbs onto the droplet surfaces due to the surfactant's amphiphilic nature. In addition to being dissolved (and also dissociated, since SDS is an anionic surfactant) as monomers in the continuous phase, the surfactant can also form micellar and lyotropic structures in the continuous phase, if added at a sufficiently large concentrations that are typically used in creating nanoemulsions. Such structures are typically smaller than the droplets in the emulsion, and due to thermal Brownian excitations of both droplets and these structures, are typically be difficult to separate. Such micellar structures that have maximum spatial dimensions that are smaller than or about the average diameter of the droplets are not viewed as being inhomogeneous regions of concentrated surfactant, at least for the purposes of surfactant separation and recovery. Typically, the phase change that is induced to affect the surfactant causes the growth of inhomogeneous surfactant-enriched regions. In some cases, these regions have at least one spatial dimension that is substantially larger than the average diameter of the droplets in order to facilitate surfactant separation and recovery. If the nanoemulsion produced by droplet rupturing has a droplet volume fraction, $\phi$, that is large enough so that droplets can potentially interact strongly and frequently, then $\phi$ can be first reduced by dilution with the pure liquid 'base' of the continuous phase. This is a precaution that may be optional in some cases but necessary in others in order to prevent coalescence of the droplets at a later stage in the process. Droplets at higher $\phi$ could potentially coalesce if there is a phase change that affects the surfactant in the system and reduces the repulsive interaction barrier between droplet interfaces that provides stability against droplet coalescence. If this optional dilution step is used, then the surfactant concentration would also necessarily be reduced, assuming the surfactant resides in the continuous phase. In the next step, the nanoemulsion is subjected to at least one of a temperature change or a composition change that induces a phase change of the surfactant into a more concentrated or even pure form. For instance, in the case of SDS, cooling the emulsion below a temperature of about 4° C. but above a temperature of about 0° C. will cause the SDS surfactant in the solution to crystallize and form macroscopic sized pure crystals that can be easily separated from the nanoemulsion using a sieve, mesh, filter paper, or porous filter that allows the much smaller nanodroplets and unfrozen surfactant solution to freely pass through. These crystals of surfactant can be dried or they can remain as a slurry, which can be recycled back into the emulsification process and re-heated into a solution phase before the premixed emulsion is made.

At room temperature (T≈23° C.), uniform aqueous solutions of sodium dodecyl sulfate (SDS) can be made up to concentrations of hundreds of millimolar, well beyond the critical micelle concentration. However, if the temperature of an aqueous SDS solution is lowered, for instance, to only T≈4° C., this alters the solubility of the SDS in the water phase significantly, and a significant portion of the SDS can crystallize out of the continuous phase, forming a solid phase of surfactant without also solidifying the continuous water phase. These SDS surfactant crystals typically have maximum dimensions that are at least an order of magnitude larger than those of nanoscale droplets of oil (e.g. PDMS silicone oil) in nanoemulsions. In fact, these surfactant crystals can even have macroscopic dimensions. The large size difference between the maximum dimensions of the surfactant crystals and the nanodroplets thereby permits an efficient means of separating the surfactant crystals (or an enriched slurry of surfactant crystals) from the nanoemulsion droplets in an aqueous continuous phase that has a significantly reduced concentration of surfactant. As we have demonstrated, when a nanoemulsion is cooled, excess SDS that does not partition to the droplet surfaces and does remain in the bulk continuous phase can crystallize out into a solid phase without causing significant droplet coalescence. This is important, since if the phase change of the surfactant (solidification or phase separation) would cause significant droplet coalescence, and such droplet coalescence would usually be undesirable.

Gravitational draining can be one method of separating the solidified surfactant crystals from the majority of the nanoemulsion. Other methods of efficient separation include filtering (e.g. using a filter membrane that captures solid crystals of surfactant while letting through the nanoemulsion droplets), osmosis, wicking, sedimentation, sieving, and draining. Some separation methods may utilize pumps to create flows, and may also use membranes, porous media, filters, and fritted glass that can have a characteristic pore size. Typically, the characteristic pore size of the separation method lies is less than an average maximum spatial dimension of a surfactant-enriched region (e.g. crystal) and is greater than the average droplet diameter in the emulsion. Typically, filtration or other size-separation methods, will involve the surfactant being the retenate (what is retained by the filter) and the nanoemulsion with reduced surfactant concentration as the permeate (what is passed through the filter). Both the retenate and the permeate are valuable products of the process we have described. The retenate can be heated and/or diluted in order to re-use surfactant efficiently in an emulsification process, and the permeate is valuable since many products involving nanoemulsions (e.g. cosmetics) can benefit from a reduction in surfactant concentration, including by reducing costs associated with the surfactant material in the product.

Many kinds of processes and devices exist for separating solid particulates from slurries, which contain these particulates, and in some embodiments of the current invention, these processes and devices are applied to a nanoemulsion at the proper temperature and pressure to remove solidified surfactant from a nanoemulsion without creating significant droplet coalescence. This method of separation permits higher surfactant concentrations to be used while flow-rupturing droplets (e.g. this can be useful for producing smaller droplet sizes during emulsification), and, subsequent to surfactant separation and recovery, the recovered surfactant can be re-dissolved and used for further emulsification of additional quantities of oil to form additional quantities of nanoemulsions. It can be reasonably expected that these methods would extend not just to oil-in-water nanoemulsions, but also to other types of emulsions in which water is not the primary component in the continuous phase.

Alternatively, some types of surfactants other than SDS do not easily crystallize (e.g. certain non-ionic surfactants), but instead form a surfactant-enriched liquid-like inhomogeneities (i.e. regions), which in some cases can phase-separate spontaneously after an environmental change. In some cases, these surfactant-enriched liquid-like inhomogeneities can be separated by a density difference between these surfactant-enriched inhomogeneities and the remaining water-based nanoemulsion. By adjusting the temperature to cause the phase separation of the surfactant into a surfactant-enriched liquid-like regions while still maintaining the stability of the nanodroplets, it is possible to localize and remove the surfactant-rich liquid-like regions, leaving a dispersion of stable nanodroplets that are still stable against coalescence in a greatly reduced concentration of the surfactant phase in the continuous phase. The surfactant-enriched regions can often be separated because they can either cream or settle due to a difference in mass density with respect to the remaining water-based emulsion. Separating and recovering a surfactant-enriched liquid-like phase can be desirable because the surfactant-enriched phase can be re-used for subsequent nanoemulsification and the reduced concentration of surfactant in the nanoemulsion will result in a lower cost of making the nanoemulsion and possibly desirable physical properties that will be better for certain consumer applications.

Another variation of this approach is to inject and mix an additive with the nanoemulsion that interacts with the surfactant in solution and causes the surfactant to precipitate out of solution. An example of this involving SDS is to add a salt, such as sodium chloride or magnesium chloride, or a saline solution to the nanoemulsion. This change in composition through the addition of salt, which at least partially dissociates in the water, thereby increasing the ionic strength, can cause the SDS in the continuous aqueous phase of the nanoemulsion to form crystals by shifting the thermodynamic chemical equilibrium between solvated and non-solvated (i.e. crystallized) surfactant phases through LeChatelier's principle. After the crystals have grown to sufficient size compared to the characteristic pore size of a separation system, separation of the surfactant-rich regions from the nanoemulsion can be achieved as before Regardless of the method of phase change and method of separation used, the approach creates a phase change of the surfactant in the continuous phase of the nanoemulsion that significantly enhances the subsequent separation of the surfactant without causing complete desorption of surfactant from the surfaces of the nanodroplets, which would lead to the undesirable consequence of nanodroplet coalescence and destabilization of the nanoemulsion. Once recovered, the volume fraction of droplets in the nanoemulsion that has reduced surfactant concentration can be re-concentrated through heating/evaporation, by dialysis, or by ultracentrifugation. Provided this increase in $\phi$ is not too extreme, the nanoemulsion can remain stable. In the laboratory, silicone oil-in-water nanoemulsions at 10 mM SDS concentration can remain stable up to very high volume fractions exceeding $\phi>0.7$ even at temperatures approaching 90° C. The degree to which the nanoemulsion could be subsequently concentrated in $\phi$ depends on the remaining surfactant concentration, the type of surfactant, the temperature, and other factors.

As already indicated above, during at least one of a change in environment and a change in composition that creates surfactant-enriched regions in an emulsion without causing significant droplet coalescence, the long-range interaction potential between the droplets can sometimes change from repulsive to attractive. The existence of a long-range attractive interaction between the droplets while a short-range repulsion still exists that inhibits coalescence, can lead to a secondary minimum in the droplet interaction potential that is much deeper than thermal energy. If this occurs, in addition to creating surfactant-enriched regions in an emulsion, droplet aggregates or flocs can form. These aggregates or flocs of droplets can then cream or settle due to a density difference between the droplets and the continuous solution phase in the earth's gravitational field. After creaming/settling in a static container, there would be a region rich in aggregates of nanodroplets and a region that would essentially contain few to no nanodroplets. The continuous solution phase of surfactant in the region that has few to no nanodroplets could then be separated by flowing this liquid out of a portion of the container, until the dense phase containing nanodroplets would approach the outlet channel. The separated stream of solution phase containing the surfactant could then be re-used. The separated aggregates of droplets could then be disaggregated by adding the pure liquid 'base' (i.e. water) of the continuous solution phase to reduce the strength of the attractive interaction between the droplets. Using this approach can be more difficult in a flowing system, because the flow can tend to break up large clusters that would otherwise form and cream. In order to use this process in flow, it would most likely be necessary to have a membrane or porous filter that would provide a separation of the aggregates from the surfactant solution. Such a separation scenario involving droplet aggregation or flocculation can sometimes be more difficult if the mass density difference between the droplet material with respect to the continuous phase and the mass density difference between the surfactant-enriched regions with respect to the continuous phase have the same sign and similar values.

Although the example in FIG. 1 is for an oil-in-water emulsion or nanoemulsion, the same process could be used for water-in-oil emulsions. The same surfactant reduction process could be used for double emulsions, double nanoemulsions, or even multiple emulsions and multiple nanoemulsions.

This method of surfactant reduction can also be used to re-use and re-cycle a wide variety of emulsion droplet stabilizers and surface active materials, including proteins, polypeptides, co-polypeptides, lipids, and lipopeptides. This can be desirable because these materials are exotic and may cost even more than common surfactants.

The method of surfactant recovery will function most efficiently according to some embodiments of the current invention when there is a surfactant that is highly soluble in the continuous phase and that will undergo a phase transition into an easily separable and recoverable form, as described in the examples herein, after only moderate changes in at least one of the temperature, pressure, pH, or ionic strength of the emulsion system, without destabilizing the nanoemulsion system and without causing droplet coalescence.

The method of surfactant recovery will function efficiently according to some embodiments of the current invention when the surfactant in the continuous phase is a supersaturated solution of surfactant and is therefore even more susceptible to a phase change that may even spontaneously occur without a change in environmental conditions.

Example 1

In this example, according to an embodiment of the current invention, we demonstrate a reduction of the surfactant concentration of a silicone oil-in-water nanoemulsion by an environmental thermal process that causes a solidification of a portion of a surfactant in the nanoemulsion's composition. The nanoemulsion was created at room temperature and has an oil droplet volume fraction $\phi=0.1$. The oil is poly-dimethylsiloxane (PDMS) having a viscosity of 10 cSt, and the nanoemulsion is stabilized by sodium dodecyl sulfate (SDS) surfactant at a concentration in water of C=100 mM. For temperatures above room temperature (approximately 23° C.), after mixing the SDS into water, the SDS forms a uniform solution (which contains SDS micelles) in the aqueous phase; the SDS concentration is still below the solubility limit at that temperature. At this value of C, there is approximately 0.72 g of SDS in 25 ml of nanoemulsion, using a molar mass of SDS of approximately 288 g/mol. The nanoemulsion was produced by premixing the oil into the surfactant solution to create a microscale emulsion, and then the droplet size was reduced using 8 passes of microfluidic homogenization at 80 psi air pressure (19,200 psi liquid pressure) with a 75 micron Y-style interaction chamber using a Microfluidics model 110S Microfluidizer®. Any residual heating of the nanoemulsion caused by the extreme flow does not cause a phase change of the SDS surfactant. A stable silicone oil-in-water nanoemulsion that has a well-defined oil volume fraction and surfactant concentration provides a quantitative starting point for the surfactant phase change and separation process.

A phase change of a substantial portion of the SDS surfactant in the nanoemulsion, namely solidification of the SDS surfactant, has been achieved as follows. Approximately 25 mL of the nanoemulsion was poured into a glass jar, covered with an airtight cap, and the glass jar was placed in a refrigerator at a temperature of about 4° C. (i.e. a "cold" state significantly lower that room temperature). Although this temperature can cause solidification of the SDS surfactant, which has been taken beyond its solubility limit by reducing the temperature to 4° C., this 4° C. temperature is high enough so that the water remains liquid and does not freeze. Likewise, the silicone oil inside the droplet remains liquid, since it can only be induced to vitrify at temperatures well below the freezing point of water. After quenching to this lower cold temperature, a portion of SDS in the nanoemulsion begins to solidify as crystals. We waited approximately 12 hours to enable the SDS crystals to grow to a very large size that can be easily separated using a fritted glass disk extraction thimble (e.g. Pyrex® extraction thimble ASTM 40-60C #33950-SC) that has an approximate average pore size of 40 μm to 60 μm. This pore size is substantially larger than the droplet radius of the silicone oil droplets in the nanoemulsion, yet this average pore size of the fritted glass disk is also substantially smaller than a typical maximal spatial dimension characterizing the SDS crystals. It can be reasonably expected that a similar separation could be performed more rapidly after the phase change is induced if the chosen separation apparatus has a smaller average pore size, yet while keeping this pore size significantly larger than the average diameter of the nanoemulsion droplets.

The separation of a substantial portion of the phase-changed surfactant in the nanoemulsion was achieved as follows. After inducing the phase-change by a temperature quench, the cold nanoemulsion is actually a multiphase system consisting of a slurry of SDS crystals that shares the same aqueous continuous phase with the nanoscale silicone oil droplets. This nanoemulsion/SDS crystal slurry is loaded into the top portion of the fritted glass extraction thimble, and gravity caused draining of the nanoemulsion into a cold glass jar below. After gravitational separation, the concentrated slurry containing SDS crystals remains in the top of the extraction thimble above the fritted glass disk, and a nanoemulsion having a reduced surfactant concentration is held in the jar below. A residual quantity of nanoscale silicone oil droplets remains in the upper slurry, but the majority of droplets are in the separated nanoemulsion in the lower cold glass jar. This process was performed at atmospheric pressure and cold temperature (4° C.). No obvious signs of droplet coalescence were observed either before or after the separation process. For this particular trial, the separated slurry mass recovered was 6.41 g, and the mass of the recovered nanoemulsion was 17.13 g. The separated slurry was evaporated in order to estimate the amount of SDS recovered, and about 0.5 g of SDS was recovered (after correcting for the mass of residual oil droplets that were in the separated slurry). This recovered SDS mass is a substantial fraction of the original mass of about 0.76 g of SDS surfactant in the nanoemulsion. Some SDS surfactant remains in the recovered nanoemulsion, and this is actually desirable, since the nanoemulsion would destabilize if all of the surfactant were removed.

We have measured the average droplet radius, $\langle a \rangle$, before and after the phase change and the separation, using dynamic light scattering (DLS). The initial radius prior to the phase change and separation process was measured to be $\langle a_i \rangle=60\pm2$ nm, and the final average radius of the silicone oil droplets in the recovered nanoemulsion after the phase change and separation process was measured to be $\langle a_f \rangle=61\pm2$ nm. These values are essentially identical, within experimental error. This demonstrates that this embodiment of the phase change and separation process yields a nanoemulsion having reduced surfactant concentration, yet does not substantially alter the average droplet radius.

We have also measured the volume fraction of the recovered nanoemulsion that has a reduced surfactant concentration by evaporation, subsequent to the phase change and separation, and we find that the droplet volume fraction in the recovered nanoemulsion likewise remains essentially unchanged: $\phi\approx0.1$. Based on mass measurements before and after evaporation of the water, we estimate that the SDS surfactant concentration in the recovered nanoemulsion has been reduced to approximately $C_f\approx50$ mM. This represents approximately a 50% reduction in the surfactant concentration as a result of the surfactant phase change and separation process. Moreover, approximately 70% of the initial nanoemulsion was converted into a surfactant-reduced nanoemulsion and recovered without an appreciable change in the droplet radius. It can be reasonably expected that greater than 70% of the initial nanoemulsion can be converted into a surfactant-reduced nanoemulsion by this process if a pressure that is stronger than gravitational pressure is applied to the slurry above the fritted porous glass disk in order to force more of the residual nanoemulsion that was retained in the upper slurry through the fritted glass disk and into the lower jar.

Example 2

In this example, according to an embodiment of the current invention, we demonstrate a reduction of the surfactant concentration of a silicone oil-in-water nanoemulsion by causing a solidification of a portion of a surfactant in the nanoemulsion's composition. The nanoemulsion was created at room temperature and has a droplet volume fraction $\phi=0.05$ (PDMS oil having a viscosity of 10 cSt) stabilized by SDS surfactant at a concentration in water of C=200 mM. The nanoemulsion was produced using 8 passes of microfluidic homogenization at 80 psi air pressure (19,200 psi liquid pressure) with a 75 micron Y-style interaction chamber using a Microfluidics model 110S Microfluidizer®. At this temperature and ionic strength, after mixing, the SDS forms a uniform solution (which contains SDS micelles) in the aqueous phase; the SDS concentration is still below the solubility limit at that temperature. At this value of C, there is approximately 1.44 g of SDS in 25 ml of nanoemulsion.

The phase change of a substantial portion of the surfactant in the nanoemulsion, solidification of the SDS, has been achieved as follows. Approximately 27 mL of the nanoemulsion was poured into a glass jar, covered with an airtight cap, and the glass jar was placed in a refrigerator at a temperature of about 4° C. (i.e. "cold" conditions). Although this temperature is low enough to induce a solidification of a significant quantity of SDS in the aqueous phase, this temperature is high enough so that the water remains liquid and does not freeze. Likewise, the silicone oil inside the droplet remains liquid. After quenching to this lower cold temperature, a portion of SDS in the nanoemulsion begins to solidify as crystals. We waited approximately 12 hours to enable the SDS crystals to grow to a very large size that can be easily separated using a fritted glass extraction thimble (Pyrex® ASTM 40-60C #33950-SC), as previously described.

The separation of a substantial portion of the phase-changed surfactant in the nanoemulsion was achieved as follows. After the phase-change, the cold nanoemulsion is actually a multiphase system consisting of a slurry of SDS crystals that shares the same aqueous continuous phase with the nanoscale silicone oil droplets. This nanoemulsion/SDS crystal slurry is loaded into the top portion of the fritted glass extraction thimble, and gravity caused draining of the nanoemulsion into a cold glass jar below. After gravitational separation, the concentrated slurry containing SDS crystals remains in the top of the extraction thimble above the fritted glass disk, and a nanoemulsion having a reduced surfactant concentration is held in the jar below. A residual quantity of nanoscale silicone oil droplets remains in the upper slurry, but the majority of droplets are in the separated nanoemulsion in the lower cold glass jar. This process was performed at atmospheric pressure and cold temperature (4° C.). No obvious signs of droplet coalescence were observed either before or after the separation process. For this particular trial, the separated slurry mass recovered was 8.09 g, and the mass of the recovered nanoemulsion was 19.41 g. The separated slurry was evaporated in order to estimate the amount of SDS recovered, and about 1.2 g of SDS was recovered (after accounting for the mass of residual oil droplets that were in the separated slurry). This recovered SDS mass is a substantial fraction of the original mass of about 1.5 g of SDS surfactant in the nanoemulsion. Some SDS surfactant remains in the recovered nanoemulsion, and this is actually desirable, since the nanoemulsion would most likely destabilize if all of the surfactant were removed.

We have measured the average droplet radius, $\langle a \rangle$, before and after the phase change and the separation, using dynamic light scattering (DLS). The initial radius prior to the process was measured as $\langle a_i \rangle=56\pm2$ nm, and the average final droplet radius after the phase change and separation process was measured to be $\langle a_f \rangle=60\pm2$ nm. Within the run-to-run variation of the DLS apparatus, there is not a significant difference in the droplet radii, before and after the process, since the values overlap at one standard deviation. This demonstrates that this phase change and separation process yields a nanoemulsion having reduced surfactant concentration, yet does not substantially alter the average droplet radius.

We have also measured the volume fraction of the recovered nanoemulsion that has a reduced surfactant concentration by evaporation, subsequent to the phase change and separation, and we find that the droplet volume fraction likewise remains essentially unchanged: $\phi\approx0.05$. We estimate that the SDS surfactant concentration in the recovered nanoemulsion has been reduced to approximately $C_f\approx60$ mM. This represents approximately a 70% reduction in the SDS surfactant concentration in the nanoemulsion recovered after the phase change and separation process, compared to the original SDS surfactant concentration. Moreover, in terms of volume, more than 70% of the original nanoemulsion was converted into a surfactant-reduced nanoemulsion.

Based on this result, it can be reasonably expected that even greater reductions in SDS surfactant concentrations can be achieved for nanoemulsions that have a larger initial SDS surfactant concentration than 200 mM, since the resulting SDS concentration after the process is in the range of roughly 50 mM to 60 mM, regardless of the initial SDS surfactant concentration. Moreover, it can be reasonably expected that it is possible to further reduce the final SDS surfactant concentration in the recovered nanoemulsion by controlling the lower cold temperature to be lower than 4° C., yet remaining at temperatures above the freezing point of the aqueous continuous phase. It can also be reasonably expected that a similar phase change and separation process can be achieved with greater rapidity and efficiency than what we have demonstrated if a smaller average pore size (e.g. of a fritted disk, filter, or membrane) can be used to separate growing crystals of the solidified surfactant from the nanodroplets. It can also be reasonably expected that a similar separation method to the one we have demonstrated in this example can be used to reduce the surfactant concentration of a nanoemulsion having droplet volume fractions below about $\phi\leq0.5$. For $\phi$ larger than this approximate limit, it can be expected that the elastic nature of the nanoemulsion may decrease the efficiency of separation, although some separation would still be possible.

Example 3

According to an embodiment of the current invention, separation and recovery of a cationic surfactant, cetyltrimethyl ammonium bromide (CTAB), from a nanoemulsion has also been accomplished without causing a significant increase in the average droplet radius. A PDMS (10 cSt) silicone oil-in-water nanoemulsion at a droplet volume fraction $\phi$=0.1 was prepared using a CTAB concentration of 100 mM using a microfluidic homogenizer (Microfluidizer® 110PS) equipped with a Y-style interaction chamber at 30,000 psi liquid pressure after 6 passes of the emulsion through the device. This concentration of CTAB was above the solubility limit at room temperature, so the aqueous CTAB solution was supersaturated with CTAB surfactant. This supersaturation can be accomplished by using an ultrasonic bath to agitate the CTAB powder that has not yet dissolved in deionized water, thereby forming a clear solution after about 20 minutes. After emulsification, the average measured initial droplet size of the nanoemulsion (using dynamic light scattering) was $\langle a_i \rangle$=45±3 nm. To further increase the concentration of CTAB in the nanoemulsion and reduce the droplet volume fraction, this nanoemulsion was diluted in a 1:1 volume ratio with a 150 mM aqueous CTAB solution that contains no droplets. The resulting CTAB nanoemulsion had $\phi$=0.05 and [CTAB]=125 mM, and 24.5 g of this nanoemulsion in a glass jar was placed in a refrigerator at 4° C. This nanoemulsion contained a mass of approximately 1.12 g of CTAB surfactant. About four hours after the nanoemulsion reached a temperature of 4° C., the nanoemulsion was inspected, and visible crystals of CTAB surfactant had formed in the nanoemulsion. The crystals in the nanoemulsion were separated using an extraction thimble and gravitational draining (as described in Examples 1 and 2) into 5.2 g of slurry of CTAB crystals and 19.3 g of nanoemulsion. There were no visible crystals in the recovered nanoemulsion after separation. Thus, about 77% of the mass of the nanoemulsion was recovered using this simple separation process. The measured average final droplet radius of the recovered nanoemulsion after separation (using dynamic light scattering) was $\langle a_f \rangle$=37±3 nm, very similar to and no larger than $\langle a_i \rangle$. The total mass of the recovered CTAB surfactant was determined by evaporating water from the slurry, and after estimating the residual droplet mass in the slurry and subtracting this out, the mass of recovered CTAB is approximately 0.6 g. This represents a recovery of more than 50% of the CTAB surfactant that was in the original nanoemulsion prior to inducing the surfactant phase change.

Observations of CTAB crystallization in nanoemulsions that had been quenched to 4° C. indicated that a longer period of time was needed (e.g. several days), as compared to crystallization of SDS under similar conditions, for the CTAB crystals to grow to dimensions visible with the naked eye at 4° C. Although the time required for crystal growth to surpass the pore size of the extraction thimble was longer for this example using CTAB than for the examples using SDS, the process of surfactant separation was still achieved at almost similar levels of efficiency in terms of materials recovery without inducing significant droplet coalescence. It can be reasonably expected that some cationic surfactants, other than CTAB, would form crystals that become visible to the naked eye over a time scale similar that found for SDS after quenching the temperature.

The embodiments illustrated and discussed in this specification are intended only to teach those skilled in the art the best way known to the inventors to make and use the invention. Figures are not drawn to scale. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

I claim:

1. A system for producing emulsions, comprising:

a liquid supply system;

an emulsification system in liquid connection with said liquid supply system to receive a first liquid and a second liquid from said liquid supply system while in operation to be used to produce an emulsion therefrom; and a surfactant recovery system connected to said emulsification system to receive said emulsion when produced from said first and second liquids, wherein said second liquid is immiscible with said first liquid, and wherein said surfactant recovery system recovers at least a portion of surfactant from said emulsion when said emulsion is received from said emulsification system.

2. A system for producing emulsions according to claim 1, wherein said surfactant recovery system subjects said emulsion to a change in an environmental condition comprising at least one of a change of temperature, pressure, evaporation, ionic strength, pH, or chemical composition of said emulsion to cause said surfactant to form surfactant-enriched localized regions of concentrated surfactant.

3. A system for producing emulsions according to claim 1, further comprising:

a surfactant supply system; and a surfactant mixing system connected to said surfactant supply system and to said liquid supply system, wherein said surfactant mixing system is adapted to receive surfactant and to mix said surfactant with at least one of said first and second liquids to be provided to said emulsification system.

4. A system for producing emulsions according to claim 3, wherein said surfactant mixing system is connected to said surfactant recovery system to receive recovered surfactant to be recirculated for further production of additional emulsion.

5. A system for producing emulsions according to claim 1, wherein said emulsification system is a multistage emulsification system.

6. A system for producing emulsions according to claim 5, wherein said multistage emulsification system comprises a high-flow mixer suitable to produce a nano-emulsion.

7. A system for producing emulsions according to claim 5, wherein said emulsification system is adapted to produce emulsions having ensemble average radii less than 1 μm.

8. A system for producing emulsions according to claim 5, wherein said emulsification system is adapted to produce emulsions having ensemble average radii less than 100 nm.

9. A system for producing emulsions according to claim 1, wherein said surfactant recovery system comprises a surfactant phase change system and a surfactant separation system.

10. A system for producing emulsions according to claim 9, wherein said surfactant phase change system comprises a temperature control system and a heat exchange system.

11. A system for producing emulsions according to claim 10, wherein said temperature control system and said heat exchange system is a temperature-controlled refrigeration system.

12. A system for producing emulsions according to claim 9, wherein said surfactant separation system comprises a filtration system.

13. A surfactant recovery system, comprising:

a surfactant phase change system adapted to receive an emulsion for processing, said emulsion comprising a plurality of droplets of a first liquid in a second liquid and having a first concentration of a surfactant, said surfactant phase change system being further adapted to subject said emulsion to a change in an environmental condition that causes said surfactant to form surfactant-enriched localized regions of concentrated surfactant; and a surfactant separation system adapted to remove at least some of said surfactant-enriched localized regions of concentrated surfactant from said emulsion such that said emulsion has a second concentration of said surfactant that is less than said first concentration of said surfactant.

14. A surfactant recovery system according to claim 13, wherein said surfactant phase change system is adapted to subject said emulsion to said change in said environmental condition to provide at least one of a change of temperature, pressure, evaporation, ionic strength, pH, or chemical composition of said emulsion to cause said surfactant to form said surfactant-enriched localized regions of concentrated surfactant.

15. A method of producing an emulsion, comprising:

providing first and second immiscible liquids;

emulsifying said first and second liquids to provide an emulsion comprising a plurality of droplets of said first liquid in said second liquid, said emulsion having a first concentration of a surfactant;

subjecting said emulsion to a change in an environmental condition that causes said surfactant to form surfactant-enriched localized regions of concentrated surfactant; and removing at least some of said surfactant-enriched localized regions of concentrated surfactant from said emulsion such that said emulsion has a second concentration of said surfactant that is less than said first concentration of said surfactant.

16. A method of producing an emulsion according to claim 15, wherein said subjecting said emulsion to a change in an environmental condition comprises at least one of a change of temperature, pressure, evaporation, ionic strength, pH, solvent quality, chemical potential of said surfactant, or chemical composition of said emulsion to cause said surfactant to form said surfactant-enriched localized regions of concentrated surfactant.

17. A method of producing an emulsion according to claim 15, further comprising recycling at least some surfactant obtained from said removing at least some of said surfactant-enriched localized regions of concentrated surfactant from said emulsion for the production of additional emulsion.

18. A method of producing an emulsion according to claim 15, wherein said emulsion has an initial temperature after said emulsifying, and wherein said subjecting said emulsion to said change in said environmental condition comprises cooling said emulsion to a preselected temperature that is lower than said initial temperature of said emulsion.

19. A method of producing an emulsion according to claim 18, wherein said surfactant is selected from surfactants that crystallize at said preselected temperature and said first and second liquids are selected from liquids that remain liquids at said preselected temperature.

20. A method of producing an emulsion according to claim 19, wherein said surfactant is sodium dodecyl sulfate, said first liquid is oil and said second liquid is water.

21. A method of producing an emulsion according to claim 19, wherein said removing at least some of said surfactant-enriched localized regions of concentrated surfactant from said emulsion comprises filtering to separate at least some crystallized surfactant from said emulsion such that said emulsion has said second concentration of surfactant.

22. A method of producing an emulsion according to claim 15, wherein said emulsifying provides an emulsion such that said plurality of droplets have an ensemble average radius less than 1 μm.

23. A method of producing an emulsion according to claim 15, wherein said emulsifying provides an emulsion such that said plurality of droplets have an ensemble average radius less than 100 nm.

24. A method of producing an emulsion according to claim 15, wherein said emulsifying provides a double emulsion such that at least one of said plurality of droplets of said first liquid has a droplet of said second liquid therein.

25. A method of producing an emulsion according to claim 15, wherein said second concentration is sufficient to prevent coarsening of said emulsion for a predetermined period of time.

26. A method of producing an emulsion according to claim 15, wherein said second concentration of said surfactant is less than one-half said first concentration.

27. A method of recovering surfactant from an emulsion, comprising:

subjecting said emulsion to a change in an environmental condition that causes said surfactant to form surfactant-enriched localized regions of concentrated surfactant; and removing at least some of said surfactant-enriched localized regions of concentrated surfactant from said emulsion such that said emulsion has a second concentration of said surfactant that is less than said first concentration of said surfactant.

28. A method of recovering surfactant from an emulsion according to claim 15, wherein said subjecting said emulsion to a change in an environmental condition comprises at least one of a change of temperature, pressure, evaporation, ionic strength, pH, or chemical composition of said emulsion to cause said surfactant to form said surfactant-enriched localized regions of concentrated surfactant.

* * * * *